March 29, 1949. W. F. FARAGHER ET AL 2,465,363
PRODUCTION OF SYNTHETIC ELASTOMERS
Filed Nov. 8, 1943 3 Sheets-Sheet 1

INVENTOR
W. F. FARAGHER
J. W. HARRISON
BY
ATTORNEY

March 29, 1949. W. F. FARAGHER ET AL 2,465,363
PRODUCTION OF SYNTHETIC ELASTOMERS
Filed Nov. 8, 1943 3 Sheets-Sheet 3

INVENTOR
W. F. FARAGHER
J. W. HARRISON
BY
ATTORNEY

Patented Mar. 29, 1949

2,465,363

UNITED STATES PATENT OFFICE 2,465,363

PRODUCTION OF SYNTHETIC ELASTOMERS

Warren F. Faragher, Swarthmore, Pa., and James W. Harrison, Woodbury, N. J., assignors to Houdry Process Corporation, Wilmington, Del., a corporation of Delaware Application November 8, 1943, Serial No. 509,431

4 Claims. (Cl. 260—93)

The present invention relates to improvements in catalytic polymerization and has particular reference to new and improved methods for the production of synthetic rubber which result in a characteristically new type of synthetic rubber.

Initially, attempts were made to duplicate natural rubber in both physical and chemical characteristics. This attempt at duplication was dropped in favor of the production of materials differing chemically from natural rubber, but having to some extent the physical characteristics thereof. Initially, the most important processes were based on a single phase reaction employing sodium as a catalyst. In this work there was, of course, no water present since the sodium would react violently therewith. In the early 1920's, development of the modern method of polymerization to synthetic rubber started and involved polymerization of diolefins in a water emulsion.

Present commercial processes are disadvantageous in several respects. In the first place, the polymerization requires a reaction time on the order of fifteen hours. Secondly, the crepe produced has poor milling characteristics. Further, it should be noted that the reactors, operating under the conditions known in the art and in present commercial use, are of stainless steel or of glass lined materials. This entails a very substantial investment cost for a plant of commercial size.

Figure 4:
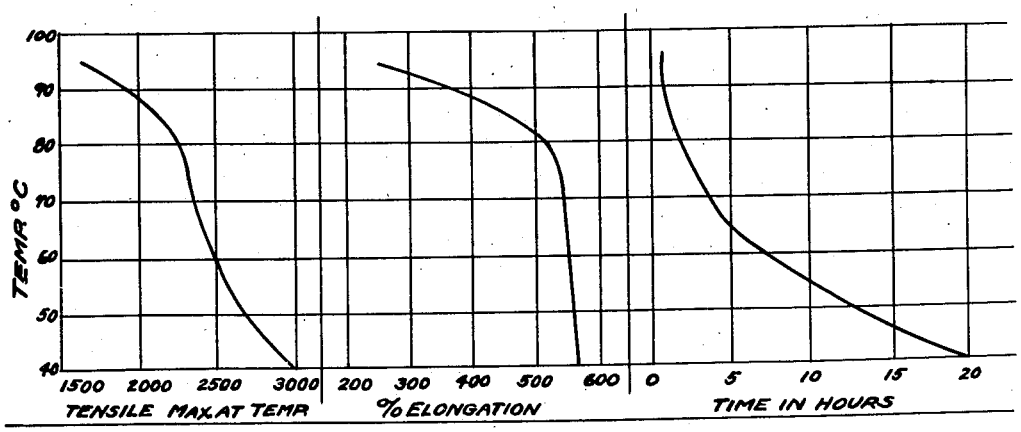

The reaction time could be reduced considerably by running at a higher temperature. When it is attempted to increase the temperature of a batch autoclave in order to reduce the reaction time the physical properties of the rubber produced become progressively lower up to approximately 80° C., above which there is a sharp and very marked decrease in physical properties. Fig. 4 of the drawing illustrates this degeneration of the physical properties of the rubber produced in a batch autoclave at varying reaction temperature. This figure is a group of graphs showing the effect of temperatures from 40 to 93° C. on tensile strength, on percent elongation of the rubber produced, and on reaction time; the reaction time being selected to give the maximum tensile strength under the conditions of operation. The reaction mixture was the conventional 75 parts butadiene and 25 parts styrene, 200 parts water, 5 parts soap, .3 part potassium persulfate and .6 part dodecylmercaptan, each by weight. When the temperature was raised from 40° to 80° C. the tensile dropped off from 3000 to 2250. The elongation was substantially constant at between 500 and 600%, whereas the time dropped from 22 hours to one and three-quarters hours. By increasing the temperature to 93° C., however, the maximum tensile was obtained in only three-quarters of an hour. However, the tensile was only 1620 and the elongation dropped to 245%. For this reason elevated temperatures have not been used for the production of synthetic rubber, though temperatures up to about 80° C. have been mentioned in the patent literature on emulsion polymerization.

Objects of the present invention are to provide improved processes for the production of synthetic latex in short reaction time which avoid detrimental effect on the physical properties of the cured rubber, to provide processes for the production of synthetic latex of substantially improved milling properties, and to provide processes for the production of synthetic rubber which allow the employment of ordinary carbon steel for the reactor. Other objects and advantages will be apparent as the description proceeds.

The present invention is of particular application to high temperature polymerization of conjugated diolefin emulsions to latex in a tubular reaction zone. In accordance with the present invention the deposition of polymer in the zone is prevented by agitation effected by flow of the emulsion in the zone.

Figure 1:
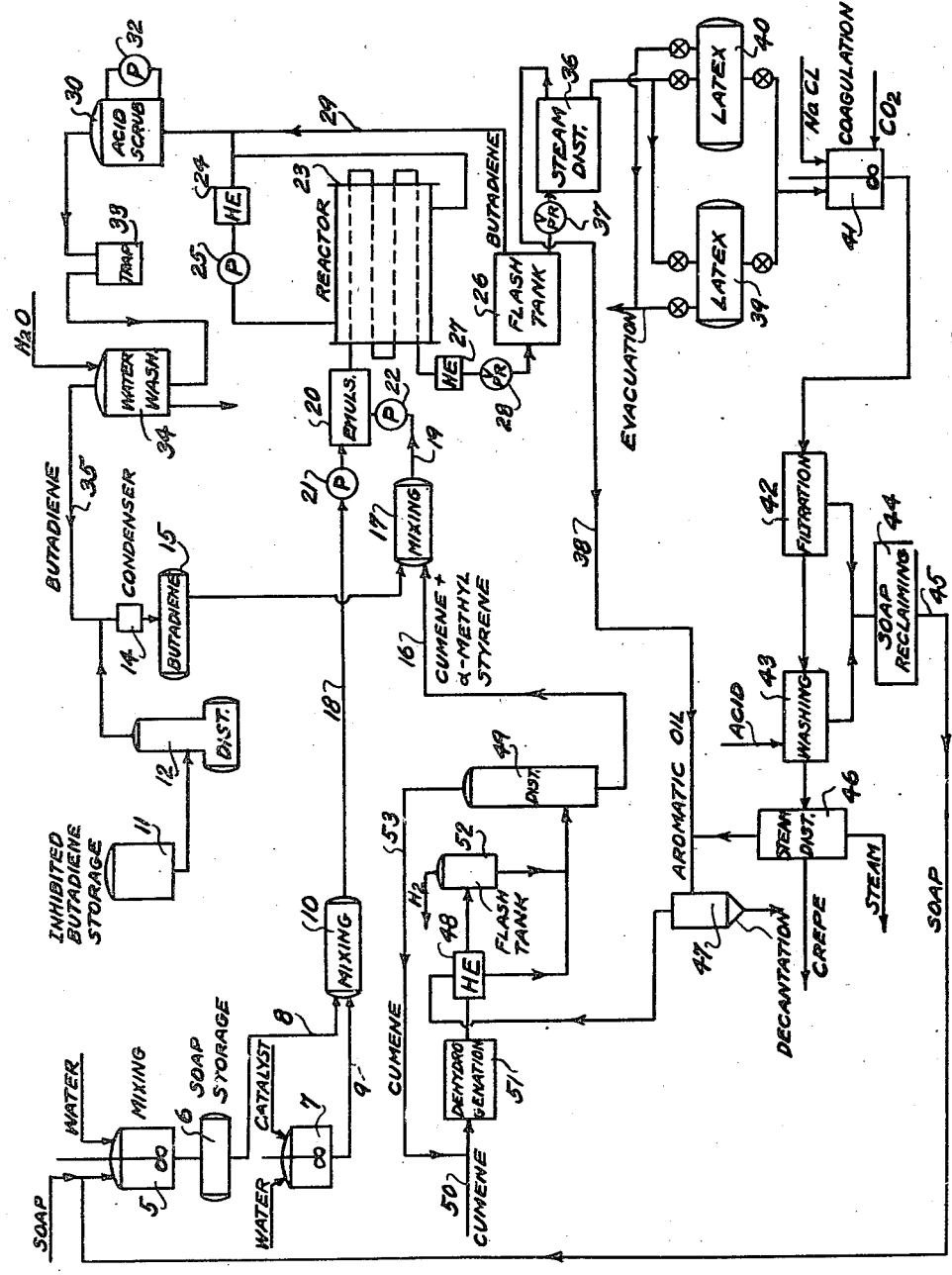
Figure 2:
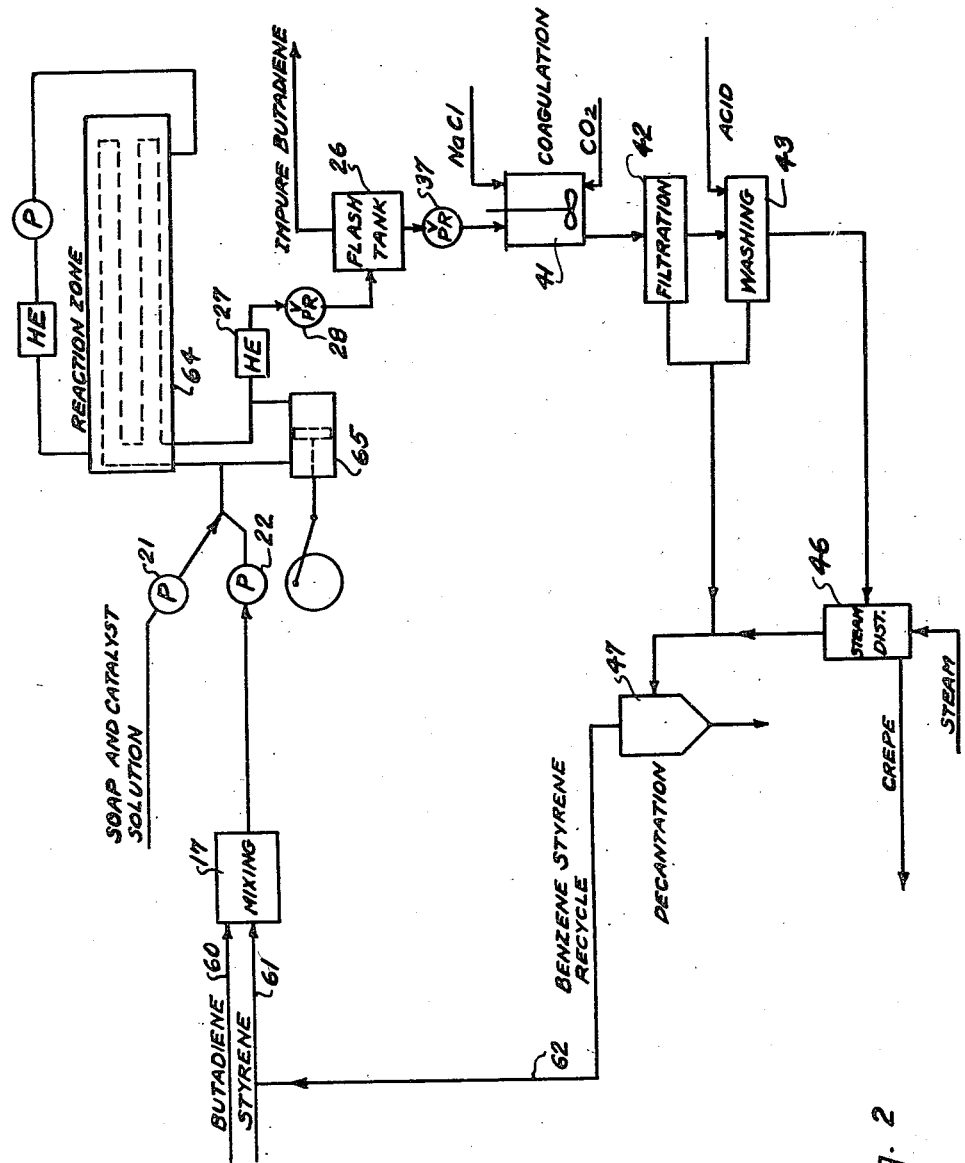
Figure 3:
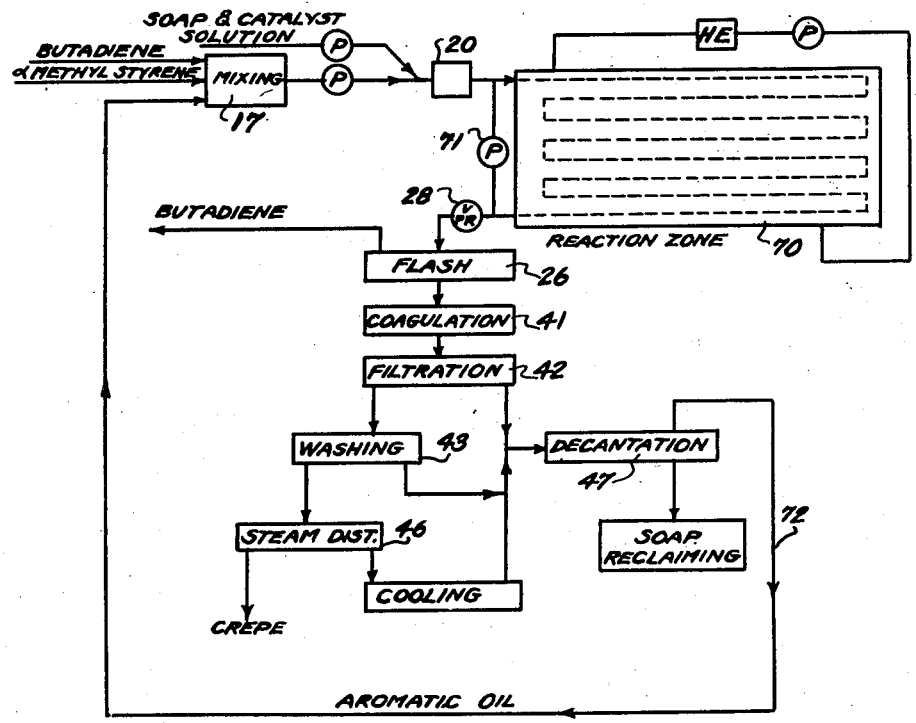

In the accompanying drawings Figs. 1 to 3 are flow sheets of different systems embodying the present invention, while Fig. 4 is a composite graph of the effect of temperature variations from 40° to 93° C. upon time of reaction and physical properties of rubber produced.

Any conjugated diolefin may be employed in the present processes, including, for instance, butadiene itself or any suitable butadiene derivative, such as isoprene, 2-3 dimethyl butadiene or 1-methyl butadiene.

Other unsaturated materials may be copolymerized with the conjugated diolefin to produce rubber, for example compounds having a styrene nucleus, such as styrene, α-methyl styrene, ortho, meta, or para-methyl styrene, α-para dimethyl styrene, or ortho-para dimethyl styrene. These and other unsaturated materials copolymerizable with butadiene to latex are well known in the art and have frequently been discussed in the literature.

The polymerization reaction is conducted in an aqueous emulsion. Any suitable emulsifying agent may be employed, such as soap or a suitable soap substitute. Thus, sodium oleate, sodium stearate, and triethanolamine stearate are desirable soaps for the purpose. Alternatively, any of the soap substitutes known for this purpose may be employed, such as fatty alcohol or acid sulfates or sulfonates, such as lauryl sulfate or sulfonate, the sulfate or sulfonate of lauric acid, and alkylated napthalene sulfonic acids, and salts of higher fatty amines. Optionally, an emulsion stabilizer may be added such as glue, agar agar or starch. Likewise, for stabilization, one may withdraw emulsion from the reactor before reaction, after partial reaction, or after polymerization is complete, and introduce it into the materials to be emulsified.

The polymerization is conducted in the presence of a catalyst. Any of the well-known catalysts for polymerizing butadiene emulsions to latex may be employed, as for example, alkali metal and alkali earth metal peroxides, perborates or persulfates, diazo amino benzene, benzoyl peroxide, gasoline peroxide and silver oxide. Other materials which have now been found useful in the polymerization of butadiene emulsions to latex are nickel carbonyl and tetraethyl lead. As is well known, the catalytic polymerization may be conducted in the presence of a modifier such as dodecylmercaptan. It should be noted that, under the high temperature reaction conditions of the present invention, the percent of modifier for the most desirable effect may be reduced from about 1% to not over about 0.5%.

The emulsified diolefin, together with the catalyst, is fed to a tubular reaction zone. The temperature of the reactants in the tubular reaction zone is preferably controlled by indirect heat exchange with any suitable medium circulating outside of the reactor, such as oil. The polymerization is effected at a temperature between 100° and 175° C. Sufficient pressure is employed to maintain the reactants substantially in liquid phase. In this temperature range a latex is obtained having excellent milling characteristics.

In accordance with the present invention we prevent the deposition of polymers upon the inner surface of the reactor wall by agitation of the emulsion within the zone effected by flow of the emulsion. When agitation is effected by flow of emulsion in the reaction zone one may either flow the emulsion in one direction through the tube or produce a reciprocating flow. With unidirectional flow the process is normally run continuously, though it may be employed for a batch operation by introducing the emulsion into an endless tubular reactor and pumping it in one direction through the reactor. With the reciprocating type of flow the process may be either continuous or batchwise. Thus, for a non-continuous process using reciprocating flow the emulsion is introduced into the tube under pressure and portions are then alternately introduced and withdrawn at opposite ends of the reactor. For a continuous process using reciprocating flow the withdrawal and introduction of the solution near the ends of the tube are the same, but fresh charge is continuously fed into the inlet and reaction products continuously withdrawn from the outlet of the zone.

If desired, organic solvents may also be employed to supplement agitation by flow for the prevention of deposition of polymers within the reaction tube. The solvents which may be employed include aliphatic hydrocarbons of from 3 to 12 carbon atoms or higher. Preferred solvents, in accordance with the present invention, are aromatic solvents such as benzene, toluene, xylene, ethyl benzene cumene, methyl cumene and the like. The action of the solvents may be connected with the property of swelling the higher polymers inasmuch as complete solubility of these polymers in the solvent is unnecessary in order to prevent deposition within the reactor.

The volumetric ratio of the aqueous phase of the emulsion to the hydrocarbon phase thereof may vary considerably and is not critical in the broad aspect of this invention. As indicative of the range of operation, one may employ a ratio in the range of 0.4 to 3. The amount of soap employed, preferably, is in the range of between 2.5% and 7.5% the weight of total hydrocarbon charged.

In the plant shown in Fig. 1, soap and water are introduced into a mixer 5 and the soap solution formed forwarded to soap storage tank 6. The soap employed may either be all fresh soap or be, in part, soap reclaimed from the process. Water and the desired catalyst are introduced into the mixing tank 7. The aqueous soap solution and aqueous catalyst solution or suspension are then forwarded by lines 8 and 9, respectively, to the mixing zone 10, wherein they are thoroughly intermixed. Inhibited butadiene is withdrawn from storage tank 11 and introduced into distillation column 12 wherein it is stripped of inhibitor. Butadiene withdrawn overhead from the distillation column 12 is introduced into condenser 14, operated under pressure, from which it is delivered to pressure storage tank 15. Butadiene from tank 15 and a mixture of cumene and α-methyl styrene in line 16 are introduced into mixing zone 17.

The aqueous charge in mixing zone 10 and the oil charge in mixing zone 17 are withdrawn by lines 18 and 19, respectively, and are introduced into an emulsifying zone 20 by pumps 21 and 22, respectively. Any suitable emulsifier may be employed. Preferably a continuous emulsifier is used. Suitable emulsifiers, for instance, are the vibrating valve type of emulsifier and the perforated plate type in which the mixture to be emulsified is passed through a series of plates having small diameter perforations therethrough. The emulsion so formed is introduced into reactor 23 having a reaction zone of tubular shape. Thus, in the reactor shown a continuous tube is employed. The reactor 23 is provided with a jacket containing a suitable heat transfer fluid, such as oil, which circulates in either direction through the reactor 23, heat exchanger 24 and pump 25. The reactor tube is of length sufficient that agitation is effected by flow of emulsion through the tube. The solvent supplements the agitation in preventing deposition of polymers within the tube. The violence of agitation may be controlled by increasing the length of the tube with the same through-put or by increasing the through-put with the same length of tube. Effluent latex from the reactor 23 is passed to flash tank 26 through heat exchanger 27, in which the latex is cooled, and through pressure regulating valve 28. In the flash tank 26, butadiene is flashed off and the residual latex is then ready for finishing operations.

Butadiene which is flashed off in tank 26 is forwarded by line 29 to a recovery system comprising an acid scrubbing zone 30, to remove any soap solution carried over, provided with an acid recirculating pump 32. Butadiene from zone 30 is forwarded to a liquid trap 33 and then to water washing zone 34 to remove acid from the gas. The butadiene so purified is then recycled into the condenser 14 by line 35. The effluent latex from flash tank 26 may be handled in any desired or conventional manner. As shown in Fig. 1, it is introduced into a steam distillation zone 36 operating under vacuum through pressure regulating valve 37. When the aromatic oil contained in the latex is thus separated by distillation prior to coagulation it is of utility to add an antifoaming agent in order to minimize carry-over of the synthesized polymer. The aromatic oil vapor, together with steam, is forwarded by line 38 for recovery. Residual latex is then introduced alternately into tanks 39 and 40 through valved lines, one tank being under vacuum and being filled, while the vacuum on the other tank is broken, and the tank is being discharged through a valved line to the coagulation zone 41. Conventional methods may be employed for coagulation, such as the addition of salt to the latex and bubbling of carbon dioxide therethrough. After coagulation the mixture is filtered in filtration zone 42. The coagulated latex may then be washed in zone 43 with acid. The filtrate from zone 42 and the wash water from zone 43 may then be sent for soap reclaiming at 44 and the reclaimed soap returned to mixing tank 5 through line 45. After separation of soap from the latex by the acid washing the coagulated latex may then be further steam-distilled in zone 46 to remove aromatic oil from the latex which is then ready for finishing as crepe.

The steam distillates from zones 36 and 46 are condensed and then decanted in zone 47 to separate the water, while the condensed aromatic oil is introduced into heat exchanger 48 in which it is heated. This aromatic oil contains the cumene which was charged to the reactor and any residual α-methyl styrene. In case any butadiene dimer is formed under the specific conditions of polymerization reaction which are employed, it may be separated by distillation. The mixture of cumene and α-methyl styrene is then introduced into distillation column 49. Fresh cumene is introduced by line 50 into a dehydrogenation zone for the preparation of α-methyl styrene therefrom. This dehydrogenation which is conducted in zone 51 is preferably run at low temperature in the presence of an active dehydrogenation catalyst. It has been found that unexpectedly good results with respect to the physical properties of rubber may be obtained when the cumene is dehydrogenated in this manner. The effluent from zone 51 is introduced into zone 48 in indirect heat exchange relation with recycle aromatic oil and then into tower or flash tank 52 to remove hydrogen overhead. The two streams of cumene and α-methyl styrene are then introduced into distillation column 49, wherein a rough cut distillation is made to separate some of the cumene as an overhead, which is recycled through line 53 for introduction into the dehydrogenation zone. The bottoms containing a mixture of cumene and α-methyl styrene in the proportion desired is forwarded by line 16 to mixing zone 17.

The specific system above described is of utility in any instance in which pairs are desired such as ethyl benzene and styrene or p-methyl styrene and p-methylethylbenzene.

Fig. 2 shows a form of the invention in which deposition of the polymers in the reaction zone is prevented by agitation produced by reciprocating flow of the emulsion in the reaction zone. Butadiene and styrene are fed to the system through line 60 and 61 and are introduced into mixing zone 17. There are also introduced into mixing zone 17 by line 62, the benzene employed for solvent and any recycle styrene. The oil mixture from zone 17 is fed to the reaction zone 64 by pump 22. The soap and catalyst solution, which may be prepared as shown in Fig. 1, is fed likewise to the reaction zone by pump 21.

As shown in Fig. 2, the reaction zone 64 is tubular, the reactants being fed at one end of the tubular zone and withdrawn at the other. There is provided a valveless pump 65, opposite ends of which are connected to the opposite ends of the reaction zone. By this means when the piston moves in one direction emulsion is withdrawn from the inlet end of the tube and emulsion previously withdrawn from the outlet end is reintroduced thereinto. When the piston moves in the opposite direction that material withdrawn from the inlet is reintroduced thereinto and an equal amount withdrawn from the outlet. Thus reactants at opposite ends of the reaction zone are not commingled but are maintained separate. When the reaction zone is so operated no separate emulsifier need be employed as the inlet end of the reaction zone, including the cooperating section of the pump, functions as an emulsifier.

As in Fig. 1 polymerized latex is withdrawn from the outlet of the reaction zone through heat exchanger 27 to pressure regulating valve 28, to flash tank 26 from which impure butadiene is withdrawn for purification and recirculation. The latex may then be withdrawn through pressure regulating valve 37 directly to the zone 41 for coagulation. It may then be filtered at 42, given an acid wash at 43 and the coagulated washed latex passed to steam distillation zone 46 to remove residual oil. The coagulated latex may then be rolled to crepe. The filtrate from filter 42, the wash waters from 43, and the steam distillate from 46 are then introduced into a decantation zone 47. In case the overhead from zone 47 is substantially free of butadiene dimer, this overhead may be passed directly to mixing zone 17 by line 62.

Fig. 3 shows a system in which unidirectional flow in a cyclic system is employed to effect agitation by flow in a relatively short reaction zone. In this system butadiene, α-methyl styrene and recycled aromatic oil are introduced into mixing zone 17. The soap and catalyst solution and the oil mixture are introduced into reaction zone 70 through an emulsification zone 20. The reaction zone 70 is of tubular shape and is provided with indirect heat exchange temperature control, as in Fig. 1. The reaction zone 70, as shown, is an endless tubular zone provided with a pump 71 operating in a single direction. Thus, a reciprocating pump may be employed of the conventional type having valves so that the flow is not reciprocating but is unidirectional through the pump. Accordingly, fresh reactants are continuously introduced into reaction zone at one point and reaction mixture is withdrawn at another point to the pressure regulating valve 28 and introduced into the flash tank 26, from which butadiene is withdrawn for re-circulation, preferably through a purification system, as shown in Fig. 1. The latex is then coagulated at 41, filtered at 42, washed at 43 and steam distilled at 46. The aromatic oil from the filtrate, wash water, and steam distillate may be recovered by decantation at 47 and recycled to the mixing zone 17 by line 72.

Tests of physical properties of rubber produced in the following examples were conducted using A. S. T. M. standard Recipe No. 3. The compounding and testing were in accordance with A. S. T. M. methods with the exception that to expedite the testing procedure the minimum 8 hour rest between compounding and curing was omitted and the similar rest period between curing and resting was cut to 30 minutes. While the physical constants of tensile strength and elongation are not as high using this rapid method as under the A. S. T. M. method, indicative results are obtainable, there being a good correlation between the two.

Example 1

A mixture of 60 parts butadiene, 40 parts styrene was emulsified in a soap solution, the volume ratio of soap solution to hydrocarbons being equal to 1.4, and the soap solution containing 7.5 parts of soap. There was also added 0.25 part of potassium persulfate and 0.3 part of dodecylmercaptan. This emulsion was fed continuously to a tubular reaction zone in which reciprocating flow was employed to effect agitation. The temperature in the reactor tube was maintained at about 107° C. and the emulsion was fed at a rate to give a reaction time of thirty minutes. A 78% conversion was obtained to latex which upon test had a modulus at 300% of 1560, a tensile of 2360 and an ultimate elongation of 440.

Example 2

A hydrocarbon mixture of 52.5 parts of butadiene, 17.5 parts styrene and 30 parts benzene, each by weight, was prepared. The butadiene to styrene ratio was 75:25. This hydrocarbon mixture was emulsified with 1.4 volumes of soap solution per volume of hydrocarbons (2.0 weight ratio of water to hydrocarbon), the soap solution containing 5 parts by weight of soap, 0.25 part potassium persulfate and 0.3 part dodecylmercaptan. The emulsion was passed through a reaction tube controlled to a temperature of 135° C. under a pressure of 600 lbs. per square inch. The time of contact was 30 minutes. Agitation within the reaction zone was attained by reciprocating flow within the tube at an average linear rate of seven feet per second, reactants being continuously introduced and withdrawn from the tube. A 71.1% conversion to synthetic rubber was obtained, which upon curing, had a modulus at 300% of 1400, a tensile strength of 1620, an elongation of 325 and a set of 10.

Example 3

The conditions of Example 2 were repeated except that the ratio of butadiene to styrene was changed to 60:40. A 74% conversion to synthetic rubber was obtained. Upon curing the rubber had a modulus at 300% of 1260, a tensile strength of 2030, an elongation of 450 and a set of 18. When tested under A. S. T. M. methods this rubber had a modulus at 300% of 11.35, a tensile of 2520, an elongation of 540 and a set of 24.

Example 4

Example 2 was again repeated, changing the butadiene styrene ratio to 55:45. A 73% conversion to synthetic rubber was obtained. This rubber, upon curing, had a modulus at 300% of 1250, a tensile of 2130, an elongation of 475 and a set of 27. A. S. T. M. tests showed a modulus at 300% of 1580, a tensile of 2680, an elongation of 465 and a set of 37.

Example 5

Example 4 was repeated at a temperature of 112° C. at a 40 minute time of contact. A 72% conversion to synthetic rubber was obtained, which upon testing, had a modulus at 300% of 1080, a tensile of 2870, an elongation of 610 and a set of 39.

Example 6

Example 3 was repeated with the exception that only half of the butadiene was fed at the inlet of a reaction tube together with all of the styrene. One-third of the way along the reaction tube ¼ of the butadiene was fed and the remaining ¼ of the butadiene was fed at a point two-thirds the way along the tube. A 70% conversion was obtained, which upon test, showed a modulus of 1265, a tensile of 2480, an elongation of 535 and a set of 29. The procedure was further modified by feeding no butadiene at the inlet. One-half of the butadiene was fed one-third of the length from the inlet and the remaining ½, two-thirds of the length from the inlet. A 67% conversion to synthetic rubber was obtained, which upon test, showed a modulus at 300% of 1095, a tensile of 2415, an elongation of 620, and a set of 59.

Example 7

A hydrocarbon mixture was prepared containing 42 parts butadiene, 28 parts of styrene and 30 parts benzene by weight. This was fed through a reaction tube emulsified in a soap solution equal in volume to 0.7 the volume of the hydrocarbon mixture, which soap solution contained 7 parts of soap, 0.25 part of potassium persulfate and 0.3 part of dodecylmercaptan, each by weight. Agitation was effected by flow of the emulsion in a tubular zone, as in Example 1. The reactants were fed at a rate to give a time of contact of 28 minutes and the temperature was maintained at 107° C. A 66% conversion was obtained to a rubber having a modulus at 300% of 1320, a tensile of 2920 and an elongation of 525.

Example 8

Cumene was dehydrogenated at a temperature in the range of 1000° to 1100° F. in contact with a chromium oxide alumina dehydrogenation catalyst. Hydrogen was separated from the reaction mixture whereby a mixture was obtained containing α-methyl styrene and cumene. A weight of butadiene equal to the α-methyl styrene was added to the α-methyl styrene-cumene mixture. Enough benzene was added to bring up the total of benzene and cumene to equal 30% of the total hydrocarbon mixture. This mixture was emulsified with 1.4 volumes of soap solution per volume of hydrocarbons. The soap solution contained 5 parts of soap, constituted of sodium oleate and sodium stearate, per 100 parts of hydrocarbon, and 0.25 part of potassium persulfate and 0.3 of dodecylmercaptan per 100 parts of reactants. After a 50 minute time of contact in a tubular reaction zone maintained at 135° C. and at 600 lbs. per square inch in which reciprocating flow was effected, as in Example 1, a 68.5% conversion to synthetic latex was obtained, which when processed had a modulus at 300% of 1200, a tensile of 2115, an elongation of 500 and a set of 35.

Example 9

Example 8 was repeated at a temperature of 113° C. and at a 57 minute time of contact. A 57% conversion was obtained to a rubber, which upon test, showed a modulus of 1250, a tensile of 2500, an elongation of 550 and a set of 36.

Example 10

A mixture was prepared of 21 parts of butadiene, 21 parts of isoprene, 28 parts of styrene and 30 parts of solvent constituted of saturated $C_5$ hydrocarbons and benzene, each by weight. This was emulsified with 1.4 volumes of soap solution per volume of hydrocarbons, which soap solution contained 7.5% soap based on total hydrocarbons and 0.25% potassium persulfate and 0.30 dodecylmercaptan, based on reactant hydrocarbons only. The emulsion was conducted through a continuous reaction tube at a temperature of 110° C., at a rate to give a time of contact in the tube of 55 minutes, with agitation as in Example 1. A 64.5% conversion to synthetic rubber was attained, which upon test, gave a modulus at 300% of 1195, a tensile of 2400, an elongation of 565 and a set of 40. A. S. T. M. tests gave a modulus at 300% of 1150, a tensile of 2510, an elongation of 535 and a set of 39.

Each of the runs in the above examples was conducted in tubular reactors provided with indirect heat exchange to control the temperature as indicated. In none of these runs was there any deposition of polymer within the tube. While these reactor tubes were fabricated of common carbon steel, no corrosion occurred as a result of these and other runs made under the conditions of the present invention.

We claim as our invention:

1. The process of rubber manufacture which comprises polymerizing a conjugated diolefin having 4 to 6 carbon atoms in aqueous emulsion in a tubular reaction zone, maintaining the temperature of said zone above 100° C. and below 175° C. and preventing the deposition of polymer on the walls of said reaction zone by agitation effected by reciprocating flow of the emulsion in the tubular zone.

2. The process of rubber manufacture which comprises copolymerizing conjugated butadiene and styrene in aqueous emulsion in a tubular reaction zone, continuously introducing reactants at one end of the zone and continuously withdrawing reactants from the other end of the zone, maintaining the temperature of said zone above 100° C. and below 175° C. during polymerizing, the aqueous phase of said emulsion containing between 2.5 and 7.5% of soap based on total hydrocarbons and effecting agitation of the emulsion in the zone by reciprocating flow of the emulsion in the zone.

3. The process of preparing synthetic elastomers which comprises copolymerizing in a tubular reaction zone a conjugated diolefin hydrocarbon of from 4 to 6 carbon atoms and a styrene compound from the group consisting of: styrene, α-methyl styrene, o-, m-, and p-methyl styrenes, α-p-dimethyl styrene, and o-p-dimethyl styrene; said conjugated diolefin and said styrene compound being contained in an aqueous emulsion including a mono-nuclear aromatic hydrocarbon free from side chain unsaturates and which is liquid at the recited reaction temperature, maintaining the temperature of the emulsion in said reaction zone during polymerizing at above 100° C. and below 175° C., and agitating the emulsion within the reaction zone by reciprocating flow of the emulsion, thereby preventing deposition of polymeric materials in the reaction zone.

4. The process of preparing synthetic elastomers which comprises copolymerizing in a tubular reaction zone conjugated butadiene and styrene in an aqueous emulsion including benzene, maintaining the emulsion within said zone during polymerizing at a selected temperature between 107° C. and 135° C., reciprocating the emulsion in said zone to effect agitation therein, and discharging formed polymers while at least 20% of initial polymerizable products present in the emulsion remain unreacted.

WARREN F. FARAGHER.
JAMES W. HARRISON.

REFERENCES CITED

The following references are of record in the file of this patent:

UNITED STATES PATENTS

| Number | Name | Date |
|---|---|---|
| 1,898,522 | Bock | Feb. 21, 1933 |
| 1,910,847 | Maximoff | May 23, 1933 |
| 1,973,000 | Konrad | Sept. 11, 1934 |
| 2,097,263 | Strain | Oct. 26, 1937 |
| 2,161,481 | Marks | June 6, 1939 |
| 2,234,204 | Starkweather | Mar. 11, 1941 |
| 2,259,180 | Schoenfeld | Oct. 14, 1941 |
| 2,334,195 | Hopff | Nov. 16, 1943 |
| 2,384,277 | Calcott et al. | Sept. 4, 1945 |

FOREIGN PATENTS

| Number | Country | Date |
|---|---|---|
| 312,201 | Great Britain | May 21, 1929 |
| 318,115 | Great Britain | Aug. 26, 1929 |
| 517,951 | Great Britain | Feb. 13, 1940 |
| 518,657 | Great Britain | Mar. 4, 1940 |
| 671,272 | France | Mar. 16, 1928 |

OTHER REFERENCES

A. Talalay & M. Magat, Synthetic Rubber from Alcohol, Interscience Publishers, Inc. 1945, page 140.

Certificate of Correction

Patent No. 2,465,363. March 29, 1949.

WARREN F. FARAGHER ET AL.

It is hereby certified that error appears in the printed specification of the above numbered patent requiring correction as follows:

Column 7, line 33, for the numeral "2360" read *2630*;

and that the said Letters Patent should be read with this correction therein that the same may conform to the record of the case in the Patent Office.

Signed and sealed this 20th day of September, A. D. 1949.

[SEAL]

JOE E. DANIELS,
*Assistant Commissioner of Patents.*